Figure 1:
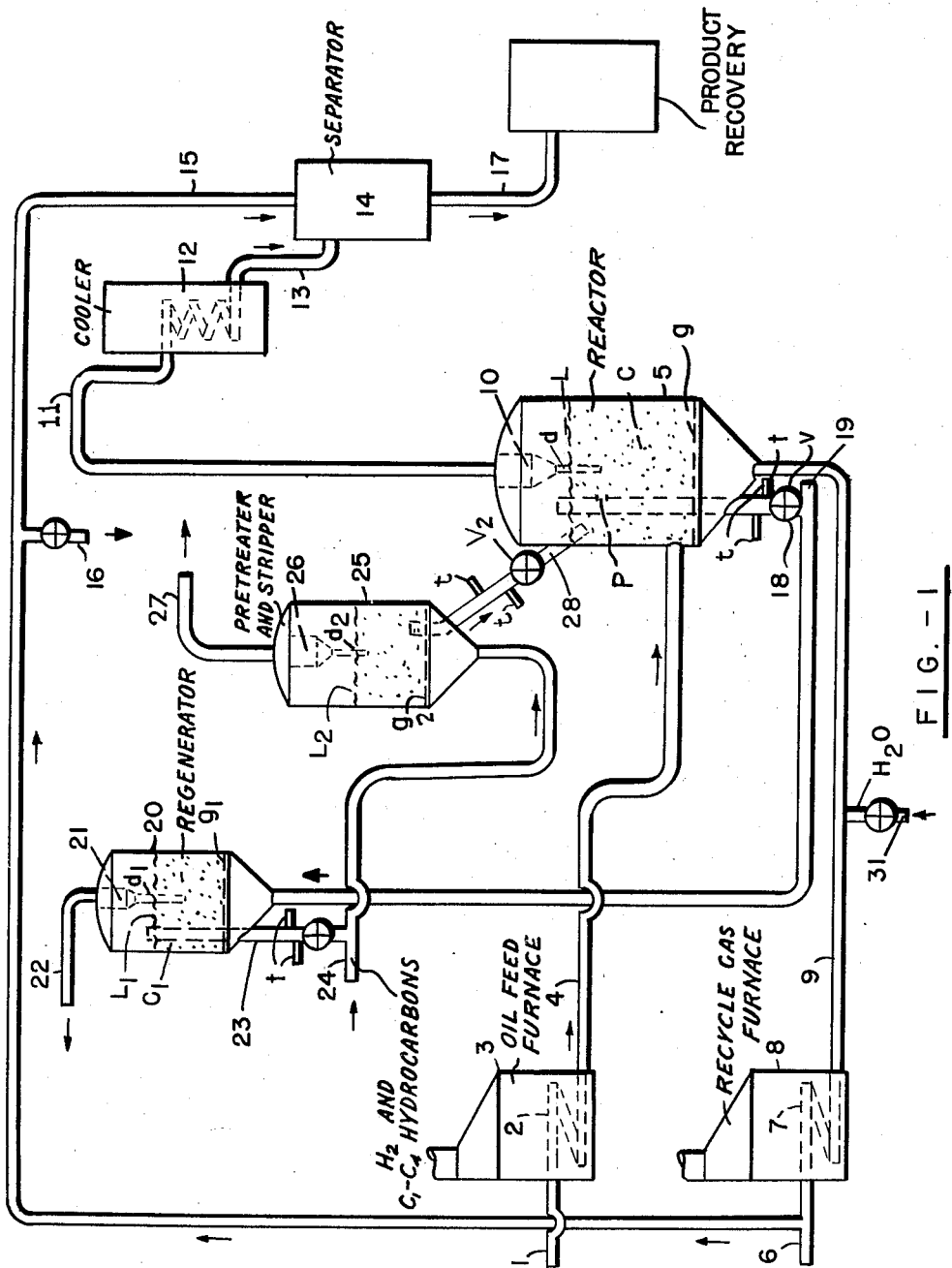

Dec. 30, 1958 K. K. KEARBY ET AL 2,866,747
AROMATIZATION AND NAPHTHA REFORMING PROCESS WHEREIN
THE CATALYST IS DEHYDRATED WITH A GAS
CONTAINING $C_1$-$C_4$ HYDROCARBONS
Filed March 4, 1953 2 Sheets-Sheet 1

Kenneth K. Kearby    Inventors
Isidor Kirshenbaum
By J. Cashman    Attorney

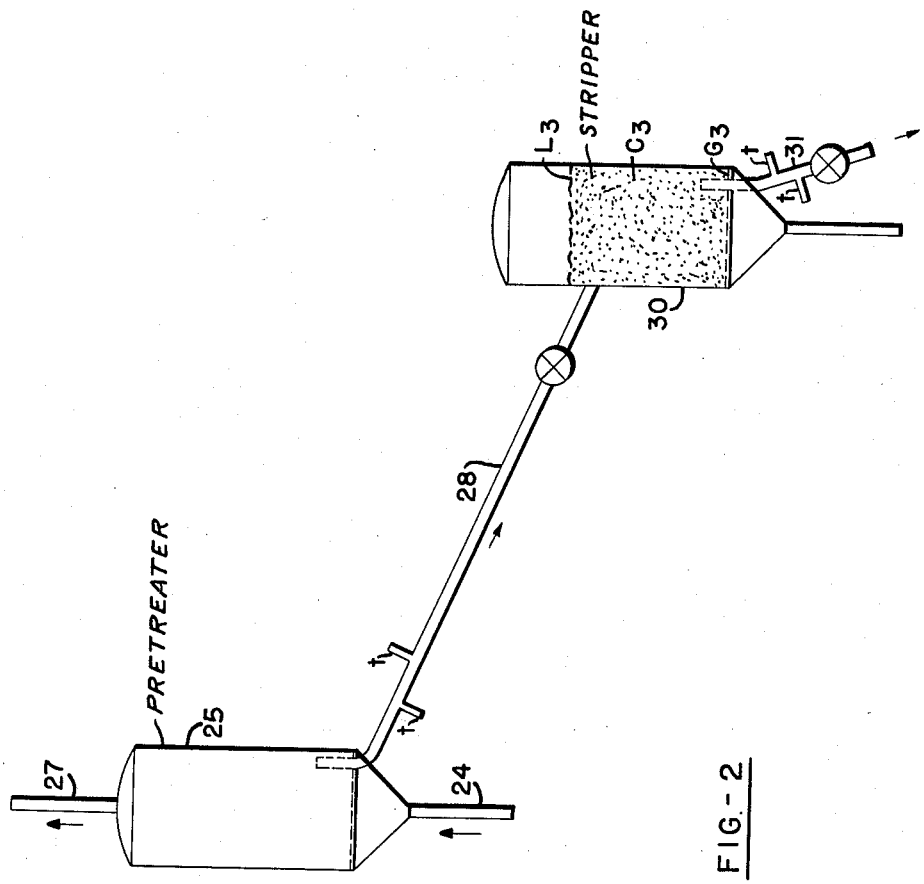

United States Patent Office 2,866,747
Patented Dec. 30, 1958

2,866,747

AROMATIZATION AND NAPHTHA REFORMING PROCESS WHEREIN THE CATALYST IS DEHYDRATED WITH A GAS CONTAINING $C_1$–$C_4$ HYDROCARBONS

Kenneth K. Kearby, Cranford, and Isidor Kirshenbaum, Union, N. J., assignors to Esso Research and Engineering Company, a corporation of Delaware Application March 4, 1953, Serial No. 340,302

7 Claims. (Cl. 208—136)

The present invention relates to improvement in the production of aromatics and the up-grading of naphthas. In particular, the present invention relates to the treatment of the catalyst employed in the aromatization and/or up-grading of naphthas so as to improve its activity and, therefore, increase the yields.

The aromatization of paraffinic hydrocarbons is a matter of record, as is also the up-grading of naphthas to improve the octane number thereof by hydroforming. The aromatization of paraffins wherein paraffins, such as normal heptane are cyclized and dehydrogenated to form toluene, has been described in prior patents and the technical literature, and the operation is usually carried out in the presence of an alumina chromia type of catalyst. A hydrogen-containing gas is fed to the reactor with the paraffinic feed for the purpose of repressing carbon formation on the catalyst. The operation is further characterized in that, normally, the operation is carried out at elevated temperatures but under substantially atmospheric pressure.

Hydroforming, on the other hand, is usually carried out to improve the octane number of naphthene-containing naphthas. For example, a feed stock boiling in the range of, say, from about 200°–350° or 375° F. is contacted at elevated temperatures and pressures, and in the presence of added hydrogen with a solid catalytic material, which may be a molybdena-alumina catalyst or it may be a platinum group metal carried on a suitable support, such as alumina. The principal reaction during the hydroforming operation is the dehydrogenation of the naphthenes to form the corresponding aromatic. However, some isomerization of hydrocarbons also occurs, and in addition, there is some hydrocracking of the heavier or higher boiling paraffins contained in the feed stock.

It has now been found that the foregoing operations may be improved by, first, minimizing the amount of water present on the catalyst in the reaction zone and, second, pretreating the catalyst following the regeneration thereof with a hydrocarbon gas containing $C_1$–$C_4$ hydrocarbons.

It is pointed out that during the aromatization of paraffins, or the hydroforming of naphthas or select hydrocarbon streams, carbonaceous deposits are formed on the catalyst and these deposits impair the activity of the catalyst so that it is necessary to treat the catalyst with a regeneration gas, such as air or air diluted with inert gas to burn off these deposits. As previously indicated, the present invention involves treating the regenerated catalyst to remove water which it may have acquired, say, during the regeneration of the catalyst and also to treat the catalyst with a gas containing normally gaseous hydrocarbons.

The main object of the present invention is to improve the aromatization of hydrocarbons and the hydroforming of hydrocarbons so as to effect improved yields.

Another object of the present invention is to conduce aromatization of paraffins and/or the hydroforming of naphthas under controlled conditions of operation resulting in improved yields of desired products and to conduct the said operation continuously.

In the accompanying drawing there is shown in Figs. 1 and 2, diagrammatically, an apparatus layout in which preferred modifications of the present invention may be carried into effect.

Referring to the drawing, 1 represents a line in which the feed to be treated is introduced into the present system. This feed is charged to a heating coil 2 disposed in a suitable furnace 3 wherein it is heated to a temperature of, say, 1000° F. and thereafter withdrawn through line 4 and charged to a reactor 5. This feed stock may be a normal hexane fraction. Reactor 5 contains a fluidized bed of an alumina-chromia catalyst which extends from a grid or screen G to an upper dense phase level L. There is also charged to reactor 5 a hydrogen-containing gas which is first charged from line 6 to a heating coil 7 disposed in a suitable heating means, such as a furnace 8. In this furnace the hydrogen-containing gas is heated to a temperature of about 1200° F. and thereafter withdrawn through line 9 and charged into the bottom of reactor 5 below the gas distributing means G. The hydrogen-containing gas passes upwardly through G and co-mingles with the hydrocarbon feed and the catalyst in bed of catalyst C. It is to be noted that the hydrocarbon feed is discharged into the bed C in close proximity to the grid G, but above the latter. The purpose of thus introducing the hydrocarbon feed is to protect it against a thermal degradation by admixture with the highly heated hydrogen-containing gas prior to contact of these materials with the catalyst. In other words, it is preferred not to mix the hydrocarbon feed and the highly heated hydrogen-containing gas prior to the introduction of these materials into the fluidized bed of catalyst. Under conditions of operation more fully set forth hereinafter, the desired conversion occurs, in this case, aromatization of the paraffin; and the crude product, together with the excess hydrogen, emerges from the dense fluidized bed of catalyst C, and passes through a dilute or light phase of suspension in gasiform material disposed above the dense bed. Prior to withdrawal of the gasiform material from the reactor 5, it is forced through one or more gas-solid contacting devices 10 wherein entrained catalyst is separated from the gasiform material and returned to the dense bed C through one or more dip pipes d. The effluent emerges from the reactor through line 11, is cooled in 12 and thence charged via line 13 to a separation zone 14, wherein normally gaseous material containing hydrogen and normally gaseous hydrocarbons, primarily, are withdrawn overhead through line 15 and recycled to line 6. A portion of this gas may be rejected from the system through line 16.

Referring again to separator 14, the crude product is withdrawn therefrom through line 17 and delivered to a product recovery system wherein it is subjected to fractional distillation and other conventional methods to obtain the desired product. The more refractory fractions may be recycled as desired.

As previously indicated, the catalyst acquires carbonaceous and other deposits during use in the reaction zone 5 and, therefore, it is necessary to regenerate the catalyst to remove such deposits. Toward this end, catalyst is withdrawn from 5 through a standpipe 18 controlled by a valve V. This standpipe carries a plurality of gas taps $t$ through which a fluidizing and/or stripping gas may be injected into the standpipe for the purpose of facilitating the flow of catalyst therein, but also to strip out adsorbed or occluded hydrocarbons. The catalyst enters the standpipe at one or more side openings 19 and flows downwardly against the stripping gas which may be steam. It will be noted that the upper end of standpipe 18 is above the dense phase level L so that the steam and stripped gases do not contact the main body of the catalyst, since the steam tends to deactivate the catalyst. The stripped catalyst is charged into an air stream 19 wherein it is formed into a suspension, and in this form is carried into a regenerator 20 where, again, it is formed into a dense fluidized bed $C_1$, which regenerator is provided with a grid $G_1$, and further, in which the dense fluidized bed of catalyst undergoing regeneration has an upper dense phase level at $L_1$. The oxygen-containing gas serves to burn off the deposits on the catalyst as it passes through the dense fluidized bed, and the regeneration fumes pass through a light or dilute phase suspension of catalyst in gasiform material which is disposed above the dense phase in the regenerator. Before the fumes are withdrawn from the regenerator, they are forced through one or more gas-solids separating devices 21 wherein entrained catalyst is removed and returned to the dense phase through one or more dip pipes $d_1$. The regeneration fumes are withdrawn overhead through line 22 and rejected from the system. Since these fumes possess sensible heat and also chemical heat, they may be utilized in the present system to preheat the feed, or the recycle gas in line 15, or otherwise employed to recover this available heat in means not shown.

Referring again to the catalyst, it should be pointed out that the same is in the form of a powder having a particle size corresponding to the below:

| | |
|---|---|
| 0–20 microns, weight percent | 0–15 |
| 20–40 microns, weight percent | 10–30 |
| 40–80 microns, weight percent | 30–50 |
| 80–200 microns, weight percent | 15–60 |

With respect to the gas velocities in the reactor 5 and regenerator 20, it is pointed out that the fluidizing velocities, generally referred to as superficial velocity, should be within the range of from ½ to 2½ feet per second. It is pointed out that by superficial velocity one means the gas or vapor velocity, assuming there is no catalyst or other material in the reactor other than the gas or vapors.

Referring again to the regenerator 20, the regenerated catalyst is withdrawn through standpipe 23 provided with the usual gas taps $t$ through which a fluidizing gas may be injected into the said standpipe for the purpose of improving the flow of catalyst therein. The flow of catalyst in the standpipe is controlled by a valve V.

As previously pointed out, one of the main features of the present invention relates to the treatment of the regenerated catalyst prior to its return to the reaction zone for further use in the process. As previously pointed out, this regenerated catalyst is treated with a gas containing $C_1$–$C_4$ hydrocarbons. Toward this end, therefore, the withdrawn catalyst is charged into a stream of gas which may be a portion of the recycle gas in line 15, namely, a gas containing hydrogen and $C_1$–$C_4$ hydrocarbons. It is pointed out that this gas should contain the said hydrocarbons in concentrations from 35–75 volume percent. The regenerated catalyst suspended in the gasiform material in line 24, is preferably charged to a stripper 25 where it is passed through a gas distributing means $G_2$ and formed into a dense fluidized bed by controlling the superficial velocity of the gasiform material within the same limits as previously disclosed in connection with the description of the formation of such beds in reactor 5 and regenerator 20. This dense fluidized bed and stripper 25 has an upper dense phase level at $L_2$ above which there is the usual dilute phase suspension extending from $L_2$ to the top of the vessel. Under conditions more fully set forth hereinafter, the catalyst is stripped of oxygen and also of water during the treatment in the said vessel 25. The conditions existing in vessel 25 will be set forth more fully hereinafter. The gasiform material emerges from the dense fluidized bed and before passing overhead from the vessel, it is forced through one or more gas-solids contacting devices 26 wherein entrained catalyst is removed and returned to the dense phase bed through one or more dip pipes $d_2$. The gaseous material is eventually withdrawn overhead through line 27 and rejected from the system. The stripped and pretreated catalyst is withdrawn from the treater 25 through a standpipe 28, controlled by a valve $V_2$ and returned to the reactor 5. As usual, this standpipe 28 is provided with fluidizing gas taps $t$ through which gasiform material may be injected into the said standpipe to improve the flowability of the catalyst therein. It should be pointed out that in treater 25 the catalyst is stripped of water, and also the hydrogen-containing gas serves to partially reduce the catalyst, or rather the VI group metal component thereof, so as to improve its performance in reactor 5. In the case of the alumina-chromia catalyst, the reduction is such that about 10% of the chromia changes valence. If the system is employed to hydroform naphthas and the catalyst is, say, 10% $MoO_3$ on 90% alumina by weight, the molybdenum oxide is reduced to a valence of between 4 and 5 in vessel 25.

Instead of a single vessel for pretreating and purging the regenerated catalyst, separate vessels may be employed with good results. In other words, the regenerated catalyst may be first passed to a pretreat vessel wherein it is treated with a hydrogen-containing gas while in the form of a dense, fluidized bed and after that treated in a second vessel while in the form of a fluidized bed with a purging gas to remove water.

If desired, a small controlled amount of water or oxygen may be added to reactor 5 by injection from line 31 into line 9 carrying the hydrogen-containing gas into the said reactor. The amount of water or oxygen should be from about ¼ mol percent $H_2O$ or $O_2$ to 2 mol percent, based on the hydrogen entering reactor 5.

Referring now to Fig. 2 which is a fragmentary showing of the complete layout of Fig. 1 depicting only the pretreating and purging portion of the complete process, this modification illustrates the use of a vessel for pretreating the catalyst and a second vessel for purging the catalyst with $C_1$–$C_4$ hydrocarbons. Toward this end the regenerated catalyst in the form of a dense, fluidized bed in 25 is treated with a gas predominantly hydrogen in the case where the catalyst is a VI group metal oxide until the catalyst is reduced as previously explained; in other words, until about 10% of the oxygen content of the chromia is removed, and in the case of molybdenum oxide until a valence of between 4 and 5 is achieved. The catalyst is then withdrawn through a standpipe 28 previously described, but now it is charged to a second vessel 30 wherein it is treated, in the form of a fluidized bed, extending from gas distributing means $G_3$ to an upper dense phase level $L_3$ by controlling the gasiform velocity in the same manner as previously described in connection with the beds of catalyst in reactor 5 and regenerator 20. The treating gas predominates in $C_1$–$C_4$ hydrocarbons and the purpose is to substantially completely remove water adsorbed, occluded or otherwise associated with the catalyst. The concentration of hydrocarbons in this treating gas may be from about 45–100%. The conditions in this treater 30 are substantially the same as those in vessel 25 of Fig. 1 except that the treating gas may have a higher concentration of hydrocarbons during the entire treating period. The treating is continued until, as stated, the water has been removed whereupon the catalyst is withdrawn through a standpipe 31 and charged to the reactor.

It will be understood that where the catalyst happens to be a platinum supported material, the pretreatment with a gas predominating in hydrogen may be omitted and the regenerated catalyst is passed directly from the regenerator to this water purging vessel 30. In fact, even where the catalyst is a VI group metal oxide suitably supported, in some cases, the treatment with hydrogen to reduce the valency of the catalyst may be omitted.

The residence time of the catalyst in the pretreater, if that procedure is used, is merely a matter of a few seconds, but may be longer. Thus, the residence time in pretreater 25 may be from 2–120 seconds. The residence time in purging vessel 30 will vary, of course, with the water content of the catalyst but in most cases a residence time of from 1–180 minutes is adequate to remove the water.

In the case where the catalyst is a VI group metal oxide on alumina, and particularly, where the catalyst is oxide on molybdena alumina, during the initial phase of the treatment in vessel 25 of Fig. 1, it is desirable to use a gas containing at least 50% hydrogen, the rest being hydrocarbons for 2–120 seconds and thereafter to employ a gas richer in hydrocarbons up to 100%. In other words, during the immediate and final stages of the treatment in this vessel 25, the gas originally is quite rich in hydrogen but after the initial period, say after 5–20 seconds, the concentration of hydrocarbons in the gas is gradually increased until, as stated, it approaches 100% hydrocarbons.

It will be understood that the treating gas may be methane alone, ethane alone, propane alone, or butane alone, or mixtures of these gases.

In order to more fully explain the present invention, the following range of operating conditions are set forth.

first hour of purge the gas contained 65–85% $H_2$ and the remainder $C_1$–$C_4$ hydrocarbons. During subsequent hours of residence in the purge section, the gas contained 100% $CH_4$, $C_2H_6$, $C_3H_8$ and $C_4H_{12}$ hydrocarbons.

N. B.—As expressed herein, the ratio of catalyst components are in terms of percentages by weight, while the ratio of gas and/or vapor components are in terms of volume percentages.

*Effect of inadequate reduction and purge*

| Reduction Plus Purge Time Hours | Percent of Removable Water Remaining on Catalyst |
|---|---|
| 0.25 | 45 |
| 0.5 | 30 |
| 1 | 15 |
| 2 | 10 |
| 5 | 2 |

The effect of incomplete removal of water by $C_1$–$C_4$ gas purge on catalyst activity can be seen from the following data for a fluid process with a catalyst to oil weight ratio of 5 fed to the reactor. The reactor was operated at 10 p. s. i. g.; 1035° F. with 2/1 $H_2$/feed mol ratio.

CONDITIONS IN REACTOR 5

| | I | II |
|---|---|---|
| Catalyst Composition | [1] $Cr_2O_3$ on $Al_2O_3$, $ZnAl_2O_4$, $Al_2O_3SiO_2$ | [2] Pt, [3] $MoO_3$ on $Al_2O_3$, $ZnAl_2O_4$, $Al_2O_3SiO_2$. |
| Temperature, ° F | 800–1,150, preferably 900–1,050 | 700–1,100, preferably 800–950. |
| Pressure, p. s. i. g | 0–1,000, preferably 0–300 | 0–2,000, preferably 50–750. |
| Feed Rate, w./hr./w | 0.1–5, preferably 0.2–3 | 0.1–20.0, preferably 0.2–5. |
| Cu. ft. of $H_2$/bbl. oil | 0–10,000, preferably 2,000–5,000 | 0–20,000, preferably 2,500–8,000. |

CONDITIONS IN THE REGENERATOR

| | | |
|---|---|---|
| Temperature, ° F | 1,150–1,300 | 1,100–1,200. |
| Pressure, p. s. i. g | 0–1,000, preferably 0–300 | 0–2,000, preferably 0–750. |

CONDITIONS IN PRETREATER 25

| | | |
|---|---|---|
| Temperature, ° F | 800–1,175, preferably 900–1,100 | 800–1,100, preferably 800–1,050. |
| Pressure, p. s. i. g | 0–1,000, preferably 0–300 | 0–2,000, preferably 0–750. |
| Composition of Treating Gas | (1) 45–75% $C_1$–$C_4$, remainder $H_2$ or (2) Initially 25–50% $C_1$–$C_4$ and 50–75% $H_2$ and then 75–100% $C_1$–$C_4$. | |

[1] 10–40 weight percent of total catalyst.
[2] 0.1 to 1.0 weight percent of total catalyst.
[3] 5 to 20.0 weight percent of total catalyst.

EXAMPLE 1

A fluid unit was operated with a light naphtha feed having an average molecular weight of 84. The oil feed rate was 840 gm. per hour, and the catalyst to oil weight ratio 5/1. The catalyst used had the composition 71% $Al_2O_3$—4.5% $SiO_2$—22% $Cr_2O_3$—1.8% $K_2O$—0.7% $Ce_2O_3$. For maintenance of maximum activity and selectivity, it was necessary to remove 33.2 gms. of water in the pretreatment and purge step from the catalyst entering the reactor each hour. The fluid unit was equipped with a pretreatment and purge section having a hold-up of about 9.7 kilograms of catalyst. Using a gas velocity of 235 liters per hour per kilogram of catalyst, the residence time of the catalyst in the pretreatment and purge section was 2.3 hours. The pressure was 0 p. s. i. g.; temperature 950° F.

The need for a thorough purge is also shown by the following data obtained in a batch fluid operation with a linear velocity of 0.2–0.3 ft./sec. and 235 volumes of purge gas per hour per 1000 gms. of catalyst. In the

*Effect of incomplete purge in pretreatment section*

| Percent of Removable Water Remaining on Catalyst | Yield of Aromatics, Vol. Percent |
|---|---|
| 0 | 43 |
| 10 | 30 |
| 20 | 26 |
| 30 | 23 |

The feed stock used in the above experiments contained 47.7% n-hexane, 30.1% methylpentane; 7.6% methylcyclopentane; 9.8% cyclohexane; 4.3% benzene; and 0.5% dimethylpentane.

EXAMPLE 2

A fluid unit was operated at 900° F. and 50 p. s. i. g. with a 90$ZnAl_2O_3$–10$MoO_3$ catalyst in upgrading a 200–330° F. virgin naphtha. An ineffectual removal of water from the catalyst during the pretreatment and purge step resulted in a 2% loss in gasoline yield at a 95 Research octane number as well as a lower catalyst activity. With an adequately pretreated and dried catalyst, the amount of water carried into the reactor by the catalyst was less than 0.3 mol percent on the recycle gas. The recycle gas rate was 3000 cu. ft. per barrel of naphtha feed. With incomplete pretreatment and purge by a $C_1$–$C_3$ rich stream, the amount of water carried into the reactor was equivalent to about 3 mol percent on the recycle gas. The results obtained are shown in the table.

*Adverse effect of water on catalyst behavior*

[200–330° F. virgin naphtha; 900° F.; 50 p. s. i. g.]

| | | | |
|---|---|---|---|
| Mol Percent $H_2O$ (on Recycle Gas) | 0.3 | 3 | Feed |
| Res. O. N. of $C_5$+Gasoline | 95 | 95 | 55 |
| Activity, w./hr./w.[1] | 0.25 | 0.15 | |
| Yields (based on feed): | | | |
| $C_5$+ Gasoline, Vol. Percent | 84 | 82 | 100 |
| Dry Gas ($H_2$–$C_3$), wt. Percent | 8 | 7.5 | |
| Carbon, wt. Percent | 0.8 | 1.0 | |

[1] Activity is defined as feed rate necessary to attain a 95 Res. O. N. product at 900° F. and 200 p. s. i. g. The lower the w./hr./w. the less active the catalyst.

The presence of water in the reactor not only decreased activity and gasoline yield but also, with this catalyst, increased carbon formation slightly.

EXAMPLE 3

A fluid unit was operated on a 90$Al_2O_3$—10$MoO_3$ catalyst at 900° F. and 200 p. s. i. g. in the hydroforming of a 200–330° F. virgin naphtha. The amount of water brought into the reactor by inefficient scrubbing of the catalyst with a $CH_4$ rich stream varied between 0 mol percent and 7 mol percent on recycle gas. The adverse effect of the incomplete stripping is shown in the following table.

*Effect of water removal from catalyst*

| | | | | |
|---|---|---|---|---|
| Mol Percent Water (on Recycle Gas) | 0 | 1 | 3 | 7 |
| Relative Activity, w./hr./w.[1] | 1.0 | 0.9 | 0.75 | 0.6 |
| $C_5$+Gasoline Yield, vol. percent | 82 | 81 | 79.5 | 79 |
| Carbon, wt. percent | 0.35 | 0.45 | 0.65 | 0.8 |

[1] Relative activity is defined as the ratio:

$$\frac{\text{Feed rate necessary to obtain 91 Res. O. N. during run}}{\text{Feed rate necessary to obtain 91 Res. O. N. during run with adequately treated catalyst}}$$

EXAMPLE 4

A fluid aromatizer was operated with a potassia promoted catalyst having the nominal composition 71% $Al_2O_3$—4.5% $SiO_2$—22% $Cr_2O_3$—2.5% $K_2O$. The feed rate, using a hexane rich refinery stream was 6800 barrels per day. The unit was operated with (a) no purge but pretreatment with $H_2$ in transfer line or reactor and (b) pretreatment and purge in a separate vessel with a gas stream containing 25% $H_2$ and 75% $C_1$–$C_3$ hydrocarbons. The results obtained are shown in the following table.

*Operation of fluid aromatizer*

| Reduction Zone | Transfer Line or Reactor | Separate Vessel |
|---|---|---|
| Reduction and Stripping Gas | $H_2$ | 25% $H_2$, 75% $C_1$–$C_3$ |
| Catalyst/feed Ratio [1] | 10 | 10. |
| Reduction Products to Reactor: | | |
| Water | 200 | 1. |
| CO, Mol/hr | 0 | 0. |
| $H_2O$ in Reactor, Mol percent on feed | 24.6 | 0.1. |

[1] Weight catalyst per weight oil entering reactor.

EXAMPLE 5

A fluid hydroforming unit was operated with a catalyst having the nominal composition 71% $Al_2O_3$—4.5% $SiO_2$—22% $Cr_2O_3$—1.8% $K_2O$—0.1% $Ce_2O_3$. After regeneration the catalyst was reduced and purged with $H_2$ until the purge gas no longer removed any water from the catalyst. The catalyst was then purged with natural gas, rich in methane. This purge removed water equivalent to about 3 mol percent on the hydrocarbon feed.

EXAMPLE 6

The following yields of aromatics have been obtained in a fluid aromatization process with properly treated and purged catalysts:

| | | | | |
|---|---|---|---|---|
| Feed Stock | Naphtha | Naphtha | Naphtha | n-hexane |
| Temp., °F | 1,045 | 1,045 | 1,045 | 1,035 |
| Feed Rate, w./hr./w.[1] | 0.13 | 0.15 | 0.20 | 0.15 |
| Aromatics, vol. percent | 31 | 30 | 28 | 44 |

[1] Weight of feed/hr./weight catalyst present in reactor at any time.

The naphtha in the above experiments contained 31.5% methylpentane, 40.8% n-hexane, 16.4% methylcyclopentane, 4.1% cyclohexane, 4.9% benzene, 0.6% dimethylpentane, and 1.7% dimethylbutane.

EXAMPLE 7

A fluid hydroformer operated at 200 p. s. i. g.; 900° F.; with a 10% $MoO_3$—90% $Al_2O_3$ catalyst in the upgrading of a 200–430° F. naphtha gave a 84.5 vol. percent yield of 96 Research octane number $C_4$+ gasoline using the pretreatment and purge with $C_1$–$C_4$ hydrocarbons described in this invention. Ineffective purge was obtained when the $C_1$–$C_4$ content of the purge gas was decreased to 25%. The gasoline yield with the ineffective purge was only 82.5 vol. percent.

Numerous modifications of this invention will be apparent to those who are skilled in the present art.

What is claimed is:

1. The method of converting hydrocarbons boiling in the naphtha boiling range which comprises contacting in a reaction zone the said hydrocarbons with a catalyst in the form of a dense fluidized bed and in the presence of added hydrogen at elevated temperatures and pressures for a sufficient period of time to effect the formation of aromatic hydrocarbons, withdrawing catalyst contaminated with carbonaceous and other deposits from the reaction zone, treating said catalyst in a regeneration zone with an oxygen-containing gas at elevated temperatures whereby such deposits are consumed by combustion and removed as fumes from the catalyst, withdrawing the regenerated catalyst from the regeneration zone, removing water from the regenerated catalyst by treating the regenerated catalyst with a gas containing a predominant amount of $C_1$–$C_4$ hydrocarbons for a period of time of from about 2–120 seconds, returning the regenerated catalyst substantially free of water to the reaction zone and feeding water to the reaction zone in an amount of from about ¼–2 mol percent based on the hydrogen entering the conversion zone.

2. The method set forth in claim 1 in which the catalyst is a VI group metal oxide supported on alumina.

3. The method set forth in claim 1 in which the catalyst is a platinum group metal.

4. In the aromatization of paraffins conducted in the presence of an alumina-chromia catalyst and added hydrogen in which process the catalyst acquires carbonaceous deposits, the improvement in the operation which comprises regenerating the thus contaminated catalyst with an oxygen-containing gas, thereafter removing water from the regenerated catalyst by treating the regenerated catalyst with a gas containing a predominant amount of $C_1$–$C_4$ hydrocarbons for a period of time of from about 2–120 seconds, returning the regenerated catalyst substantially free of water to the reaction zone and feeding water to the reaction zone in an amount of from about 1/4–2 mole percent based on the hydrogen entering the conversion zone.

5. The method set forth in claim 1 in which the regenerated catalyst is treated with a gas which contains at least 50 volume percent hydrogen during the initial phase of said treatment and thereafter the hydrocarbon content of the gas is gradually increased until the concentration of hydrocarbons is about 100%.

6. The method set forth in claim 1 in which the hydrocarbon treated is a naphtha fraction and in which the catalyst is molybdenum oxide carried on alumina, and is further characterized in that the treatment is conducted at elevated pressures.

7. The method set forth in claim 1 in which the hydrocarbon treated is a substantially pure normally liquid paraffinic hydrocarbon in which the catalyst is chromia on alumina, and which is further characterized in that during the conversion a pressure of about 0 p. s. i. g. is maintained in the conversion zone.

References Cited in the file of this patent

UNITED STATES PATENTS

| | | |
|---|---|---|
| 2,184,235 | Groll et al. | Dec. 19, 1939 |
| 2,259,486 | Carpenter | Oct. 21, 1941 |
| 2,380,938 | Burk | Aug. 7, 1945 |
| 2,406,112 | Schulze | Aug. 20, 1946 |
| 2,410,891 | Meinert et al. | Nov. 12, 1946 |
| 2,433,603 | Danner et al. | Dec. 30, 1947 |
| 2,642,381 | Dickinson | June 16, 1953 |
| 2,642,382 | Berger et al. | June 16, 1953 |
| 2,642,383 | Berger | June 16, 1953 |
| 2,689,823 | Hardy et al. | Sept. 21, 1954 |
| 2,692,847 | Rex | Oct. 26, 1954 |
| 2,694,672 | McLaren | Nov. 16, 1954 |
| 2,710,827 | Gornowski | June 14, 1955 |
| 2,749,287 | Kirshenbaum | June 5, 1956 |
| 2,758,065 | Halik | Aug. 7, 1956 |